United States Patent Office 2,859,254
Patented Nov. 4, 1958

2,859,254

DEHYDROCHLORINATION OF
TETRACHLOROETHANE

Douglas H. Eisenlohr, West Barberton, Ohio, assignor to Columbia-Southern Chemical Corporation, Allegheny County, Pa., a corporation of Delaware No Drawing. Application November 21, 1955
Serial No. 548,247

3 Claims. (Cl. 260—654)

The present invention has relation to the manufacture of trichloroethylene, and more particularly is concerned with an improved process for the thermal dehydrochlorination of symmetrical tetrachloroethane to trichloroethylene.

By subjecting symmetrical tetrachloroethane to temperatures on the order of 700° F. to 100° F. one mole of hydrogen chloride can be removed with the consequent preparation of trichloroethylene. In conducting such process, various difficulties are encountered. Higher chlorinated hydrocarbons are concurrently produced as undesirable byproducts. Some such higher chlorinated hydrocarbons such as hexachlorobenzene, hexachlorobutadiene, and hexachloroethane are of little economic value. Formation and deposition in the reactor of solids, believed to be carbon, also occur. This causes plugging and other operational inconveniences.

According to the present invention, it has been discovered that thermal dehydrochlorination of symmetrical tetrachloroethane to trichloroethylene may be conducted in a manner which minimizes or precludes formation of significant quantities of these undesirable higher chlorinated hydrocarbons and solids. This obviates plugging of the reactor and other attendant operational difficulties. Avoidance of solid formation is of particular significance when the process is conducted by passing a continuous stream of symmetrical tetrachloroethane through an elongated reaction chamber, e. g. a tubular reactor.

Now it has been discovered that the above advantages are realized by exercising careful control over the manner in which heat is applied to the symmetrical tetrachloroethane while it is at a dehydrochlorination temperature. Accordingly, the present invention involves supplying a majority of the total heat applied to the symmetrical tetrachloroethane within about the first third of the time the tetrachloroethane is at a dehydrochlorination temperature. Preferably, upwards of 50 percent and below 85 percent of the total heat applied to the tetrachloroethane is supplied during the first third of the time period at which the symmetrical tetrachloroethane is maintained at a dehydrochlorination temperature.

One technique for practicing the present invention involves utilization of a tubular or elongated reaction zone such as is provided by pipe or tubular structures. With such reactor, symmetrical tetrachloroethane is continuously fed over prolonged periods into one end of the reactor and a flowing stream thereof through the reactor along its length is established. Product-containing gases emanate from a downstream exit end of the reactor. In such operation, approximately from 50 to 85 percent of the total heat applied to the reaction system and transferred to the gaseous stream of tetrachloroethane is supplied within about the first third of the time tetrachloroethane is in the reactor.

Upon feeding tetrachloroethane continuously for extended periods, this heat input is achieved within the first third of the retention time in the reactor, or in other words, within the first third of the distance through which the reaction stream is subjected to dehydrochlorination temperature. The balance of the heat requirements are supplied during the latter two thirds of the retention time or last two thirds of the distance through which the reaction stream is in the reactor at dehydrochlorination temperature. The application of this external heat may be uniform throughout the last two thirds, or preferably is so distributed that there is a gradual decrease in heat input into the system along the line of flow of the gas reaction stream until it emanates from the reaction system and is below dehydrochlorination temperature.

Temperatures at which symmetrical tetrachloroethane may be dehydrochlorinated to trichloroethylene by a direct thermal process without recourse to catalyst range from 850° F. to 1100° F., more preferably being 875° F. to 975° F. U. S. Letters Patent 2,378,859, granted to Martin Mugden and E. H. R. Barton, indicates conversion of symmetrical tetrachloroethane to trichloroethylene may be accomplished at substantially lower temperatures, e. g. 600° F., by including a very minor concentration of chlorine or chlorine yielding material in the tetrachloroethane. The present invention is applicable to a process of this character, although optimum benefits ensue in conjunction with a plain thermal dehydrochlorination process, which require temperatures on the order of 850° F. to 1100° F.

Introduction of heat in the specified manner of the present invention is accomplishable by special utilization of known heat transfer techniques. For example, the first third of the reaction zone may be served by an independent external heating means while the latter two thirds of the reactor uses a second means. In this manner, the heat input to the first third of the reaction zone may be adjusted independent of the heat input provided in the latter two thirds of the reaction zone. In the case of furnaces utilizing gas for heating, this may take the form of separate gas mantles independently controllable. With electrical heating, the heating elements themselves may be electrically attached to independent means for controlling the electrical input thereto. Other heating devices and modes of operation thereof, useful for this purpose, will be apparent to one skilled in the art.

In dehydrochlorinating symmetrical (1,1,2,2) tetrachloroethane thermally, the reaction is conducted in the gas phase. Consequently, before being fed, the tetrachloroethane is first vaporized, usually at least to temperatures on the order of 300° F. to 500° F., or higher, and the tetrachloroethane as a vapor is introduced into an elongated tubular reactor, preferably of nickel or other non-ferrous containing metal. It is usually advantageous to maintain the tetrachloroethane below dehydrochlorination temperature until it is within the reactor, and thus the vaporization and heating of tetrachloroethane is limited to temperatures below 850° F.

In a simple form, this process elevates gaseous tetrachloroethane to dehydrochlorination temperature by utilizing the initial portion of the reactor adjacent its inlet end as a preheater. The vaporized tetrachloroethane is heated to between 850° F. and 1100° F. in this preheating zone. Once raised to dehydrochlorination temperature, tetrachloroethane is passed continuously through the tubular elongated reactor establishing a line of flow of gas therethrough. Along such line of flow, as dehydrochlorination occurs the tetrachloroethane concentration decreases and the trichloroethylene concentration increases. Thus, the gas stream emanating from the reactor, and no longer at dehydrochlorination temperature, is comprised in the main of trichloroethylene product, hydrogen chloride by-product from the dehydrochlorination and any unreacted tetrachloroethane.

In one preferred procedure, the extent of tetrachloroethane dehydrochlorination is intentionally limited to below theoretical such that the tetrachloroethane present in the effluent reaction product containing gas stream comprises a substantial quantity. Advantageously, the percent conversion of tetrachloroethane is restricted to from between about 75 to 85 percent, and thus permit approximately 15 to 25 percent of the feed tetrachloroethane to pass through the system without undergoing dehydrochlorination.

Other things being equal, maintaining the dehydrochlorination temperature below 940° F., or 950° F., say at between 870° F. and 930° F., will control the degree of conversion to within the above preferred range. Conditions such as retention time and dehydrochlorination temperature may also be varied to assist in achieving the desired degree of conversion.

The effluent gas stream from the reactor is resolved into its components or otherwise refined. Broadly, the gas stream is cooled to selectively condense its organic constituents, notably tetrachloroethane and trichloroethylene, while the hydrogen chloride remains as a gas. This separates hydrogen chloride. Thereafter, the trichloroethylene and tetrachloroethane may be separated by distillation expedients. Tetrachloroethane so separated, and when of adequate purity, may be recycled to constitute a portion of the initial tetrachloroethane feed.

The following example illustrates the manner in which the present invention may be practiced:

EXAMPLE I

The reactor in this experiment was fabricated from 24 nickel tubes 2 feet long and ½ inch in diameter. These tubes were placed in parallel and connected with U-bends to provide a continuous path for gases therethrough. With the U-bends, the total length of the reaction chamber was 50 feet. Six half-inch pipe feeds each with a ¼ inch thermocouple well were placed at points 3 feet, 10 feet, 18 feet, 26 feet, 34 feet, and 42 feet from the inlet end of the continuous tube system as fabricated and assembled. Iron-constantan thermocouples were inserted in each of the wells for temperature reading.

This nickel tube reactor was then anchored on nickel supports supported in a Selas Gradiation Heater having an inside chamber 2 feet 4 inches wide, 3 feet 8 inches high and 5 feet long. This chamber was lined with a 4 inch thick bricking of first quality brick surrounded with block insulation. A total of 12 gas burners on each side of the chamber were provided, set in the firebrick at 10 and ¼ inch vertical centers and 13 inches horizontal centers on each of the sides of the furnace.

By virtue of this disposition of the burners, the top row of the three rows of burners heated the first third of the reactor, whereas the middle and bottom rows of the burners provided heating for the latter two-thirds of the reactor. After vaporizing symmetrical tetrachloroethane, in a nickel lined heating unit, the thusly vaporized tetrachloroethane at a temperature of about 300° F. was fed into the tubular nickel reactor at the top and passed through the 50 feet thereof and out of the reactor at its bottom. Approximately 33 pounds per hour of tetrachloroethane was fed in this manner throughout an extended period of operation. Each horizontal row of burners was connected to an air-gas mixture supply means by which the rate of heating gas fed to the burner could be controlled. This control involves regulating a manifold pressure through which an air-mixture was fed prior to introduction to the burner. In these experiments, the top burners, middle burners, and bottom burners were controlled as indicated in the following table in a manner such that the top burners introduced more than half of the entire heat applied to the reactor. The manifold pressure indicates the heat feed distribution to each row of burners.

The effluent reaction mixture leaving the bottom of the tubular reactor was cooled to selectively condense the organic components thereof by passing the gaseous mixture into contact with previously condensed organics. This served to maintain the reaction evolved hydrogen chloride as a gas and accordingly separated it from the halogenated hydrocarbon reaction mixture.

The following table lists the experimental conditions and results obtained by conducting the dehydrochlorination of symmetrical tetrachloroethane in accordance with the above procedure in using the described apparatus:

*Table I*

| | | | | | | |
|---|---|---|---|---|---|---|
| Average Temp., ° F | 975 | 955 | 946 | 938 | 906 | 981 |
| Feed Rate, pounds per hour | 33 | 33 | 33 | 33 | 33 | 34 |
| Retention Time, seconds | 1.84 | 1.87 | 1.88 | 1.86 | 1.93 | 1.78 |
| Products, Mole percent: | | | | | | |
| $C_2HCl_3$ | 94.3 | 94.0 | 90.0 | 93.2 | 78.7 | 92.7 |
| $C_2Cl_4$ | 1.4 | 1.8 | 1.2 | 1.3 | 1.0 | 1.2 |
| $C_2H_2Cl_4$ | 0.6 | 1.6 | 7.3 | 3.3 | 19.7 | 4.1 |
| $C_2HCl_5$ | 0.6 | 0.6 | 0.4 | 0.5 | 0.3 | 0.5 |
| $C_2Cl_6$ | 0.7 | 0.7 | 0.6 | 0.5 | 0.3 | 0.7 |
| $C_4Cl_6$ | 0.5 | 0.3 | 0.2 | 0.3 | 0.0 | 0.2 |
| $C_6Cl_6$ | 0.2 | 0.0 | 0.0 | 0.0 | 0.0 | 0.0 |
| Misc. Residue | 1.9 | 1.1 | 0.3 | 1.1 | 0.0 | 0.7 |
| Space Velocity, feet per second | 27.1 | 26.6 | 26.6 | 26.8 | 25.8 | 28.1 |
| Conversion, percent | 99.4 | 96.9 | 92.7 | 96.6 | 80 | 95.8 |
| Yield, percent | 97.4 | 98.6 | 99.5 | 98.5 | 100.0 | 99.1 |
| Reactor Temps., ° F.: | | | | | | |
| Feet from inlet— | | | | | | |
| 2 | 435 | 240 | 595 | 780 | 695 | |
| 10 | 925 | 925 | 940 | 945 | 930 | 980 |
| 18 | 965 | 945 | 940 | 925 | 910 | 960 |
| 26 | 995 | 970 | 955 | 935 | 905 | 985 |
| 34 | 1,000 | 970 | 955 | 945 | 900 | 990 |
| 42 | 930 | 965 | 940 | 940 | 885 | 990 |
| Burners: | | | | | | |
| Top, "$H_2O$" | 10 | 10 | 12 | | 10 | 8 |
| Middle, "$H_2O$" | 2.5 | 2.5 | 1.5 | | 3 | 1 |
| Bottom "$H_2O$" | 2.5 | 2.5 | 1.5 | | 4 | 1 |

In the table, the designation "$H_2O$" indicates the manifold pressure on the gas supply heat system to the respective rows of burners. The magnitude of this measurement is proportional to the heat input to the reactor.

For most successful dehydrochlorination, the reaction chamber comprises an elongated zone of limited cross-section. Tubular reactors having internal diameters of from ½ inch to 6 inches are most practical, with tubular reactors ranging from ½ inch to 3 inches in diameter being preferred. To achieve adequate heat input as well as proper retention time in the reaction chamber, it has further been found that the overall length of the tubular reactor should be at least 200 times the internal diameter of the reactor, and should not substantially exceed 600 times the internal diameter. The gas retention time in the reactor ranges from between ½ second to 5 or 10 seconds, with most optimum results being achieved with retention time on the order of 1 to 3 seconds. Retention time, as herein employed is calculated value obtained by dividing the volume in cubic feet of tetrachloroethane fed per second (based on the average reactor temperature) into the volume in cubic feet of the reactor. It represents the time it would theoretically take a given volume of tetrachloroethane to pass through the reactor.

It will be further appreciated that the present invention, while described in terms of a preferable mode of operation, which includes the utilization of a tubular reactor through which feed tetrachloroethane is continuously introduced the invention is susceptible of practice by recourse to other expedients. For example, it may be conducted in a batch type process wherein an enclosed chamber is charged with tetrachloroethane and the heat input is controlled such that for the first third of the period that the tetrachloroethane is at dehydrochlorination temperature from about 50 to 85 percent of all the heat input is introduced with the balance being supplied during the latter two-thirds of the time the tetrachloroethane is maintained at such temperature.

While the present invention has been described with reference to certain details of specific embodiments, it is not intended that the invention be construed as limited thereto except insofar as the appended claims are concerned.

I claim:

1. The method of thermally dehydrochlorinating symmetrical tetrachloroethane to trichloroethylene which comprises introducing gaseous symmetrical tetrachloroethane into an elongated tubular reactor whereby to establish a continuously flowing gas stream through said reactor, heating said gas stream to and maintaining it at a dehydrochlorination temperature substantially throughout its passage through said reactor, introducing into the first third length of said reactor from 50 to 85 percent of the total heat supplied to said symmetrical tetrachloroethane while it is at a dehydrochlorination temperature and introducing the balance of said heat into the gas stream during its passage through the latter two-thirds of the length of the reactor by regulating independently controlled heating means for the first third length of said reactor and for the latter two-thirds of the length of said reactor.

2. The method of claim 1 wherein the dehydrochlorination temperature is maintained at between about 850° F. and 1100° F.

3. The method of claim 1 wherein the length of said tubular reactor is at least 200 times the diameter thereof, said diameter being at least ½ inch.

References Cited in the file of this patent

FOREIGN PATENTS 575,530   Great Britain _____ Feb. 21, 1946

UNITED STATES PATENT OFFICE
Certificate of Correction

Patent No. 2,859,254

November 4, 1958

Douglas H. Eisenlohr

It is hereby certified that error appears in the printed specification of the above numbered patent requiring correction and that the said Letters Patent should read as corrected below.

Column 1, line 21, for "100° F." read —1000° F.—

Signed and sealed this 28th day of April 1959.

[SEAL]

Attest:
T. B. MORROW,
*Attesting Officer.*

ROBERT C. WATSON,
*Commissioner of Patents.*